United States Patent
Jinno et al.

[11] 3,808,893
[45] May 7, 1974

[54] DENSIMETER

[75] Inventors: Sigeru Jinno, Otsu; Mitsuo Uchida, Osaka, both of Japan

[73] Assignee: Toray Industries, Inc., Tokyo, Japan

[22] Filed: July 27, 1972

[21] Appl. No.: 275,748

[30] Foreign Application Priority Data
July 30, 1971  Japan.............................. 46-56793

[52] U.S. Cl. ............................... 73/452, 73/61.1 R
[51] Int. Cl. ............................................. G01n 9/10
[58] Field of Search ........................... 73/444–454, 73/53, 61.1 R

[56] References Cited
UNITED STATES PATENTS
2,185,205  1/1940  Linebarger............................ 73/449
3,186,423  6/1965  Davidson et al.................. 73/447 X
3,377,869  4/1968  Glassey................................. 73/453
3,538,773  11/1970  Goldberg............................. 73/451

FOREIGN PATENTS OR APPLICATIONS
147,838  11/1962  U.S.S.R................................. 73/452
758,416  1/1934  France.................................. 73/449
180,396  7/1966  U.S.S.R................................. 73/448

*Primary Examiner*—Richard C. Queisser
*Assistant Examiner*—Joseph W. Roskos

[57] ABSTRACT

A float type densimeter having a float which has a chamber filled with standard fluid. The coefficients of cubical expansion of the float and the sample fluid are the same. The buoyancy of the float in the sample fluid is detected.

8 Claims, 9 Drawing Figures

DENSIMETER

BACKGROUND OF THE INVENTION

The present invention relates to a densimeter, especially a float type densimeter.

The concentration of a fluid can be measured with a densimeter. But it is necessary to compensate for the difference of temperature between the measuring temperature and the standard temperature, because the density of a fluid depends on the measuring temperature even when the concentration of the fluid is constant.

Some of the known densimeters provide for temperature compensation. For example, see Japanese patent publications No. 13253/67 and No. 2627/65.

The former publication discloses a densimeter having two vessels each containing sample liquid. In each vessel a float is provided. The sample liquid in each vessel is maintained at a different temperature and the characteristics of the liquid maintained at different temperatures is detected by movements of the floats. The concentration of the sample liquid is known, based on its characteristics at standard temperatures.

On the other hand, the latter publication teaches a densimeter using a vessel containing sample liquid and another vessel containing standard liquid. In each vessel a float is provided. The floats are connected with a balance lever. The concentration of sample liquid at standard temperature is measured by the extent of the movement of the balance lever. These prior art publications describe unique methods of temperature compensation in a densimeter, but these methods are extremely complicated and have little application for process maintenance for continuous control of concentration of fluid.

Nowadays, in view of the advances that have been made in chemical processing, a high degree development of maintenance techniques is desired. Accurate detecting of concentration of fluid in a chemical process is one of the greatly desired techniques, especially when the temperature of the fluid is variable.

For example, in a condensation process or when adjusting medical solutions or liquids, the need for such a technique becomes very strong. Much more precisely, for example, in an apparatus of withdrawing ethanol in a process for producing polyester, it becomes very important to know accurately and continuously the concentration of methanol in a water solution of methanol. Similarly, it is important to know accurately and continuously the concentration of dimethyl sulfoxide in a water solution, when producing acrylonitrile.

An object of the present invention is to provide a densimeter having a very simple mechanism, which is trouble-free, and which has accurate temperature compensation.

Additional objects and advantages will be apparent hereinafter.

SUMMARY OF THE INVENTION

The densimeter of the present invention comprises:

A. a vessel for containing a sample fluid,
B. a float floating in the sample fluid in the vessel,
C. means for detecting the extent of the force causing buoyancy of the float,
D. the float having a chamber mainly formed of thin sheet material so that the volume of the chamber is changeable smoothly,
E. the chamber being filled with standard fluid having a greater coefficient of cubical expansion than that of the sample fluid and
F. the float and the sample fluid having substantially equal coefficients of cubical expansion.

According to this invention, the concentration of sample fluid can be determined directly with a function relating only to the density of the sample fluid at standard temperature. The densimeter of this invention gives a temperature compensated value. The detailed mechanism according to the present invention is as follows. In describing this, certain symbols are referred to as follows:

$T$: standard temperature.
$t$: temperature at which measurement is being made.
$V_1$: volume of float at standard temperature.
$V_2$: volume of standard fluid in the chamber at standard temperature.
$V_3$: volume of the float except the volume of the standard fluid in the chamber at standard temperature.

$$V_1 = V_2 + V_3 \qquad (1)$$

$Ao$: coefficient of cubical expansion of the sample fluid.
$A_1$: coefficient of cubical expansion of the float.
$A_2$: coefficient of cubical expansion of the standard fluid.
$A_3$: coefficient of cubical expansion of that part of the float excepting the standard fluid part.

$$A_1 = V_2/V_1 \times A_2 + V_3/V_1 \times A_3 \qquad (2)$$

$K$: elastic modulus of a spring, from which the float is sometimes hung.
$e$: elongation of the spring.
$W_1$: weight of the float.
$Fo$: buoyancy acting on the float.
$Do$: density of the sample fluid at standard temperature.

Then, $$e \times K = W_1 - Fo$$
$$= W_1 - Do \times 1/[1 + Ao \times (t-T)] \times V_1 \times [1 + A_1 \times (t-T)] \qquad (3)$$

Now, in this invention, the coefficient of cubical expansion of the float ($A_1$) is selected so that it is equal to the coefficient of cubical expansion of the sample fluid ($Ao$), that is, $A_1 = Ao$.

Then, $$e = 1/K \times (W_1 - D_o \times V_1) \qquad (4)$$

In the formula (4), $K$, $W_1$, and $V_1$ are constants selected optionally when designing a densimeter.

Therefore the elongation ($e$) of the spring is given as a function relating to a density of the sample fluid at standard temperature and the concentration of the sample fluid can be known directly by only detecting the force acting on the float.

In designing the densimeter, the next condition is to make $Ao$ equal to $A_1$.

$$Ao > A_3 \tag{5}$$

$$Ao < A_2 \tag{6}$$

$$A_1 = V_2/(V_2 + V_3) \times A_2 + V_3/(V_2 + V_3) \times A_3 \tag{7}$$

DETAILED DESCRIPTION OF THE INVENTION

Figure 2:
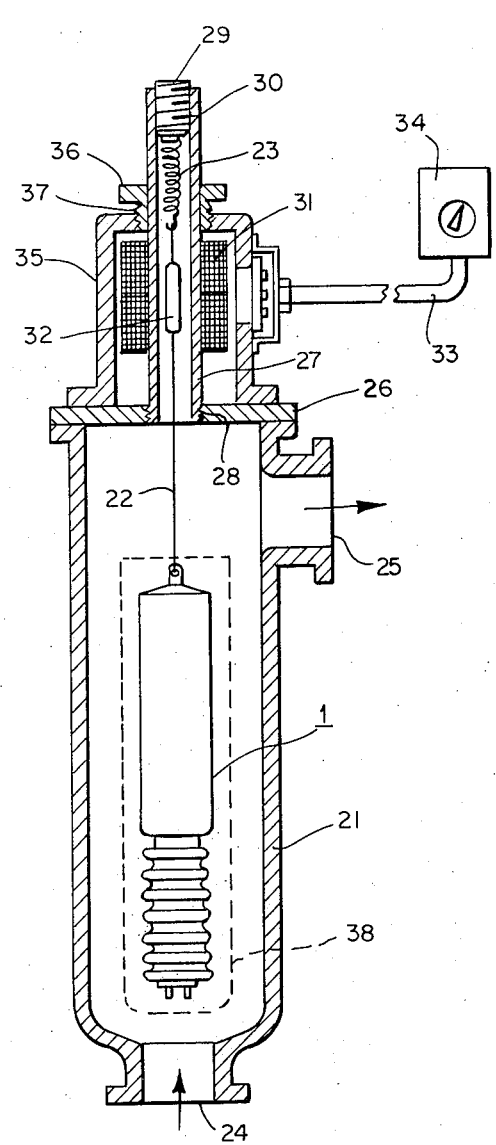
FIG. 2 is a vertical cross-sectional view of a densimeter of this invention, providing the float shown in FIGS. 1A and 1B.

Two kinds of floats are used in a densimeter of the present invention.

The one float comprises mainly two parts wherein the upper part is a column portion, and the lower part is a chamber portion which is mainly formed of thin sheet material for changing easily the volume of the chamber, and in which a standard fluid is supplied. Herein this type of float is referred to as float type I.

The other float comprises mainly a bag made of thin sheet material; the bag is deformable and standard fluid is supplied in the bag. This type of float is referred to as float type II.

The shape of the chamber or bag is selected so that it is capable of deforming smoothly according to a difference of pressure between the inner and outer chambers. With respect to the main part of the chamber, a column having bellows, a column having a multilateral cross-section, or a column having an elliptical cross-section is conveniently used.

The float type I is excellent when the coefficients of cubical expansion of the sample fluid and of the standard fluid in the chamber are of similar character. Float type II is especially useful when the coefficients of cubical expansion of the sample fluid and the standard fluid in the chamber have substantially the same characteristics.

The material forming the float should be resistant to corrosion by the sample and the standard fluid, and should have no permeability by the sample and standard fluids. It should have good thermal conductivity, reasonable elasticity for chamber deforming, good fatigue strength and good workability. For Example, the materials shown in the following table are preferably used as thin sheet materials forming the main part of the chamber wall.

| Material | Preferred Thickness of Sheet in Millimeters |
|---|---|
| Stainless Steel | 0.1 – 0.3 |
| Titanium | 0.2 – 0.5 |
| Copper Alloy | 0.1 – 0.3 |
| Aluminum | 0.1 – 0.3 |
| "Teflon" | 1 – 3 |
| Polyethylene | 1 – 3 |

For filling the chamber with standard fluid, two small diameter tubes are provided on the chamber wall respectively as fluid connections to the outer and inner chambers. Standard fluid is fed into the chamber through the one tube until it overflows from the other tube. When the fluid is a liquid, the liquid should fill up the chamber without entrapment of air, and the two-tube arrangement is beneficial for accomplishing this result. After filling the chamber with standard fluid, the tubes are pressed firmly to seal them closed. A standard fluid is desirably selected which has a coefficient of cubical expansion substantially equal to the coefficient of cubical expansion of the sample fluid, or a rate of change of these coefficients of cubical expansion such that they are similar to each other.

The standard fluid is preferably selected as a simple fluid, or a mixed fluid, or a fluid mixed with fine, solid particles which are non-reactive with the fluid.

The standard fluids shown in the following table are conveniently used to sample fluids which are also shown, together with the preferable float type.

| Sample Fluid | Standard Fluid | Float Type |
|---|---|---|
| Ethanol | Ethanol | I, II |
| Methanol | Methanol | I, II |
| Sulfuric Acid | Water solution of sulfuric acid | II |
| Sulfuric acid | Silicone oil | I |
| Dimethyl Sulfoxide | Water solution of dimethyl sulfoxide | II |

Concerning the vessel in a densimeter in accordance with this invention, a bottle type vessel is preferably used in the densimeter for laboratory use. For manufacturing use, a vessel is connected directly into the process pipe or tank, or in parallel.

As a detecting mechanism for force acting on a float, a spring system or balance lever system is preferably used. Such mechanisms are well known themselves, and these are applicable to the densimeter of this invention. Well-known feeding and indicating signal mechanisms are also usable in the densimeter of this invention.

The following descriptions relate to specific forms of the densimeter of this invention in accordance with the attached drawings, and are not intended to limit the scope of the invention as defined in the claims.

The float (1) is a float type I having a column portion (2) in the upper part of the float (1), and a chamber portion (3) for filling with standard liquid in the lower part of the float (1). The column portion (2) and chamber portion (3) are made of "teflon." The column portion (2) is formed with a cylindrical column (4) and a conical portion (5). On the bottom of the column (4), a tapped hole (6) is provided. On the top of the cone (5), a hanger hole (7) is provided. The chamber portion (3) comprises a setting plate (8) and bellows (9) having a bottom sheet (10). On the top of the setting plate (8), a screw bolt (11) is provided for securing the setting plate (8) to the column portion (2), and is screwed into the tapped hole (6). The upper part of the chamber portion (3) is fixed on the circular surface of the setting plate (8).

Two tubes (12) extend through sheet (10) for filling with standard liquid. The tubes (12) connect fluidly the inner and outer chamber (3). In this example of the float, the diameter (DA) of circular column (4) is 80 millimeters, the height (HA) of the column portion (2) is 300 millimeters, the mean diameter (DB) of bellows (9) is 70 millimeters, the height (HB) of chamber portion (3) is 170 millimeters and the thickness of the sheet forming bellows (9) is 1 millimeter.

Standard liquid is filled into the chamber (3) using the tubes (12) at standard temperature. After that, the tubes (12) are pressed to seal them closed.

Now, this float (1) has a solid portion which is formed with column portion (2) and the wall of the chamber (3), and a liquid portion which is a standard liquid in the chamber (3). The volume of the solid portion is $V_3$ and the volume of the liquid portion is $V_2$ at standard temperature. Then the volume of the float $V_1$ is the total of $V_2$ and $V_3$. Here, assuming that the volume of the float $V_1$ is 2,000 cc. at standard temperature, and silicone oil (Type SH 200 manufactured by Toray Silicone Co.) is used as the standard liquid in the chamber. The coefficient of cubical expansion of the standard liquid $A_2$ is $0.96 \times 10^{-3}/°C$. Further, assuming that the solid portion of the float is made of "Teflon", and the coefficient of cubical expansion of the solid portion $A_3$ is $36.9 \times 10^{-5}/°C$, then the coefficient of cubical expansion of the float $A_1$ is as follows:

$$A_1 = 1/2,000 \left[ (2,000 - V_3) \times A_2 + V_3 \times A_3 \right]$$

$$A_2 - V_3/2,000 \times (A_2 - A_3)$$

Here, in this invention, $A_1$ is selected so as to be substantially equal to $Ao$ (coefficient of cubical expansion of sample liquid.)
Then, $$A_1 = Ao = 0.96 \times 10^{-3} - V_3/2,000 \times (0.96 \times 10^{-3} - 36.9 \times 10^{-5})$$

(8)

When the sample liquid is determined and the coefficient of cubical expansion $Ao$ is known, the float used in the densimeter of this invention can be designed with the formula (8).

Figure 1A:
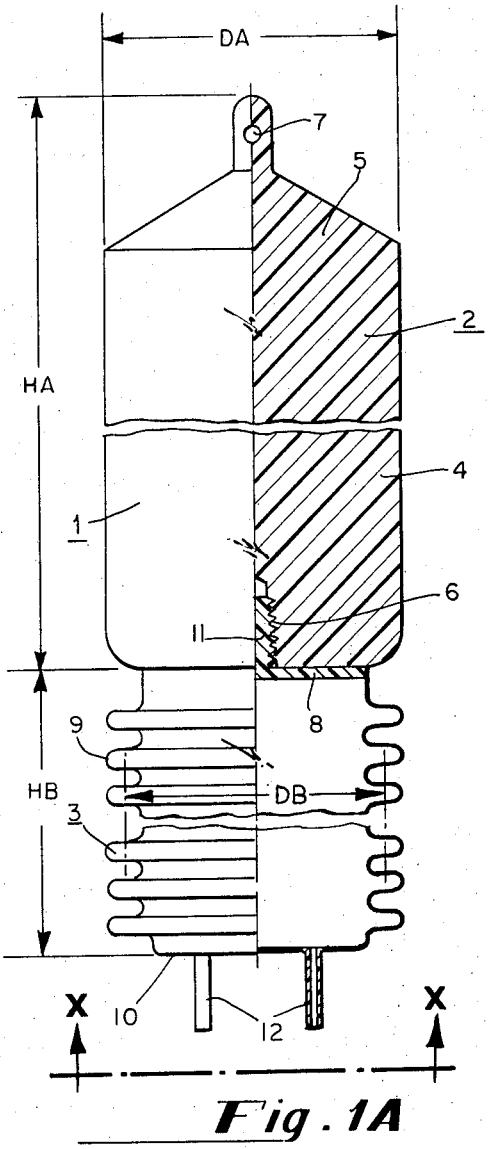
FIG. 1A is a side elevational view, partly in section, of one type of float used in a densimeter of this invention.
Figure 1B:
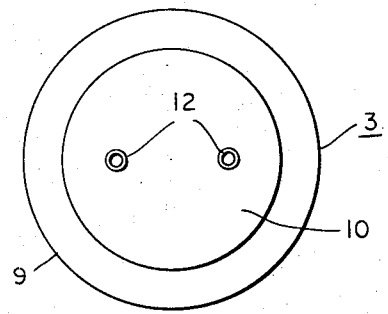
FIG. 1B is a bottom view of the float, taken as indicated by the lines and arrows X—X which appear in FIG. 1A.

FIG. 2 shows the densimeter of this invention incorporating the float shown in FIGS. 1A and 1B. The float (1) is hung into the vessel (21) with a wire (22). The wire (22) is connected to spring (23). The vessel (21) has an inlet (24) for sample liquid on its bottom and an outlet (25) for sample liquid on its upper right side. The top of the vessel (21) is covered with plate (26). The detecting tube (27) is set with screw (28) on the plate (26), and the bottom of the tube (27) is opened to the inner part of the vessel (21). The plug (29) is fixed with screw (30) in the upper part of the detecting tube (27). The spring (23) is fixed on the bottom surface of the plug (29). The outer periphery of the detecting tube (27) carries an electro-magnetic coil (31) and inside the detecting tube (27) at a position within the confines of the coil (31), a magnetic bar (32) is positioned on the wire (22). With the mechanism made up of the coil (31) and magnetic bar (32), the extent of the force causing buoyancy of the float (1) or the displacement of the float (1) is detected. The detected result is signalled electrically through lead wire (33) to the indicator (34). Such a detecting mechanism is well known per se, and the detailed descriptions are omitted here. The detecting tube (27) and coil (31) are covered with a casing (35) which is fixed on the plate (26). The detecting tube (27) is supported by the threaded tube (36) which is set on the upper part of the casing (35) by means of screw (37). To prevent any influence of the flow of sample liquid on the float (1) in the vessel (21), a protecting vessel (38) is preferably used as shown with dotted lines in FIG. 2.

Figure 3:
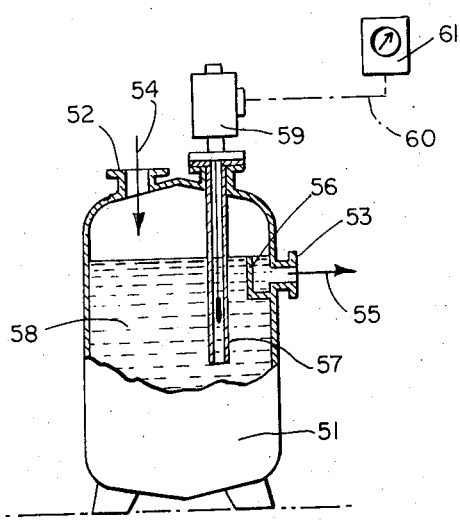
FIG. 3 is a side elevational view, partly in section, showing a densimeter of this invention in an actual process line.

FIG. 3 shows one practical set-up for using the densimeter of this invention on a process line. A tank (51) is provided on the process line (not shown in the drawing) having an inlet (52) and an outlet (53). The liquid flowing through the line enters at the inlet (52) as shown by arrow (54), and overflows from a weir (56) to the outlet (55). In the tank (51) the vessel (57) of the densimeter is provided. The bottom end of the vessel (57) is opened into sample liquid (58) and the upper part of the vessel (57) is located outside the top of the tank (51). Further on the top of the vessel (57) the detecting device (59) is fixed. Its detecting signal is sent through a lead wire (60) to the indicator (61).

Figure 4A:
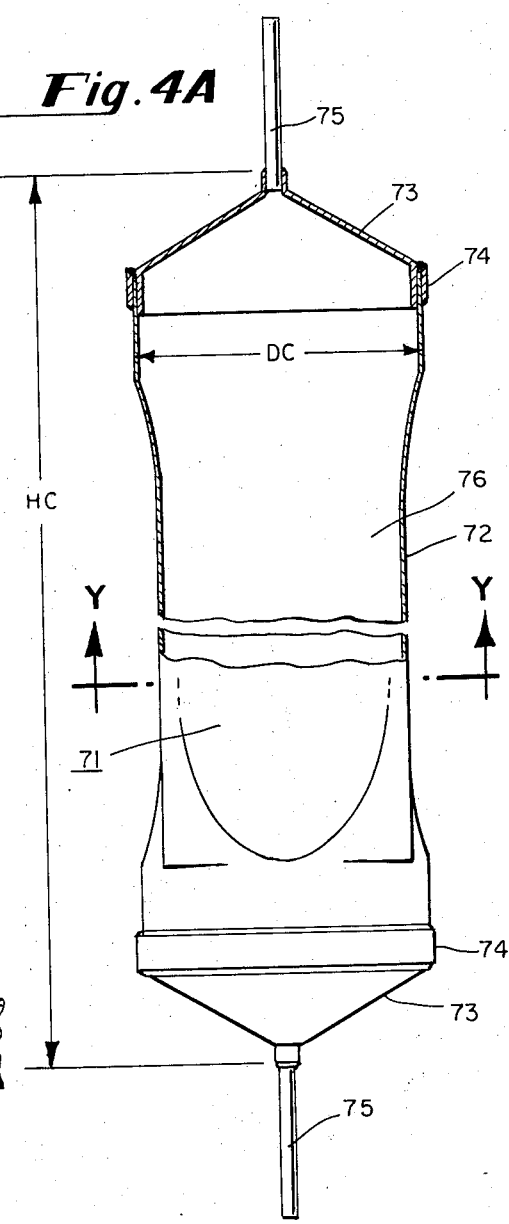
FIG. 4A is a side sectional elevational view, partly in section, of another type of float using a densimeter of this invention.
Figure 4B:
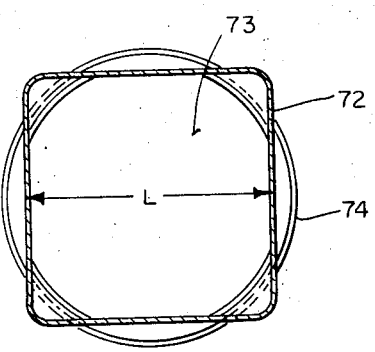
FIG. 4B is a cross-sectional view of the float, taken as indicated by lines and arrows Y—Y which appear in FIG. 4A.

The float (71) shown in FIGS. 4A and 4B is the float type II having a chamber which is mainly covered with thin sheet material. The float (71) shown in FIG. 4A is substantially symmetrical.

The body part of the float (71) has a square cross-section (see FIG. 4B) and the upper and lower ends of the body part have circular cross-sections. The top and bottom ends of the float (71) have cone shapes. The float (71) is desirably made of stainless steel sheet. The body portion (72) and cones (73) are welded to seal with an applying ring (74). At the top and bottom of the float (71) tubes (75) are fixed, and these tubes (75) are connected fluidly into the chamber (76). Standard liquid is fed through the one tube until the liquid comes out of the other tube at standard temperature. After that, these tubes (75) are sealed.

In one form of device practically used, the thickness of the sheet forming circular cone (73) is desirably 1 millimeter, the body portion (72) is desirably 0.3 millimeter. The length L of the side of the square is desirably 66 millimeters and the diameter (DC) of the circular part is desirably 78 millimeters. The high (HC) of the float (71) is desirably 640 millimeters.

Now, this float (71) has a solid portion which is mainly a chamber wall, and a liquid portion which is standard liquid. The volume of the solid portion is $V_3$ and the volume of the liquid portion is $V_2$ at standard temperature. For example, assuming that the volume of the chamber $V_2$ is 2,000 cc. at standard temperature and the volume of the solid portion $V_3$ is 58 cc. at standard temperature, and assuming that water solution of ethanol is used as the standard liquid in the chamber (76), that the coefficient of cubical expansion of standard liquid is $A_2$, that the solid portion of the float (71) is made of stainless steel, and that the coefficient of cubical expansion $A_3$ is $48 \times 10^{-6}/°C$, the coefficient of cubical expansion of the float is $A_1$:

Then, $$A_1 = (2{,}000 \times A_2 + 58 \times A_3)/(2{,}000 + 58)$$
$$= 0.971817 \times A_2 + 0.028183 \times A_3$$

(9)

On this case, $A_1$ is equal to $Ao$; therefore when the sample liquid is determined, the value $A_2$ is given by the formula (9). Then the concentration of the water solution of ethanol as standard liquid is determined from selecting a water solution of ethanol having the same coefficient of cubical expansion as $A_2$ which is given by the formula (9).

Figure 5:
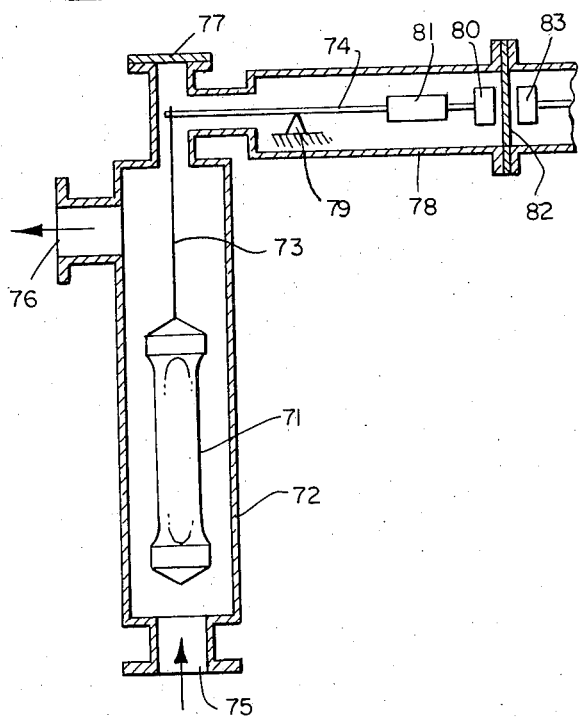
FIG. 5 is a vertical cross-sectional view of a densimeter of this invention, using the float shown in FIGS. 4A and 4B.

FIG. 5 shows the densimeter of this invention using the float shown in FIGS. 4A and 4B. The float (71) is hung into the vessel (72) with the wire (73). The wire (73) is connected to one end of the balance lever (74). The vessel (72) has inlet (75) for sample liquid on its bottom and outlet (76) for sample liquid on its upper left side. The top of the vessel (72) is covered with a plate (77). At the upper right side of the vessel (72), a detecting tube (78) is provided. The balance lever (74) is supported by supporting point (79) in the detecting tube (78). At the end of the balance lever (74) opposed to the connecting point of the wire (73), a magnet (80) is fixed. Balance weight (81) is set slidably on the balance lever (74) between the supporting point (79) and the magnet (80). The end of the detecting tube (78) is sealed with sealing plate (82). The magnet (80) faces the sealing plate (82) with clearance and another magnet (83) faces selling plate (82) with clearance at the other side of the sealing plate (82). The magnets (80) and (83) form a magnetic joint to transmit force causing buoyancy of the float (71).

This example has the ability to detect the float buoyancy extremely accurately because the balance weight (81) and the dead load of the float balance each other around the supporting point (79). Further, the shape of the float (71) is better than the bellows type as shown in FIGS. 1A and 1B as regards sticking a scale on the surface of the float.

A practical example of the design of a float using this invention will be explained. The float type II described above will be used. A water solution of ethanol has no linear thermal expansion but the densimeter of this invention has extreme sensitivity enabling it to detect and report the concentration of the ethanol accurately.

A water solution of ethanol is used as the standard liquid, and the volume of the chamber (76) is selected as 2,000 cc. as described before.

The water solution of ethanol comprising the sample liquid has 20 weight percent concentration of ethanol at standard temperature, 30°C. The volume of the solid portion of the float (71) $V_3$ is 58 cc. as described before. Now assuming that the densimeter will be used in the range from 25° to 35°C, the coefficient of cubical expansion of the water solution of 20 weight percent of ethanol $Ao$ is $0.52398 \times 10^{-3}/°C$.

Then, applying the formula (9), $$0.52398 \times 10^{-3} = 0.971817 \times A_2 + 0.028183 \times 0.048 \times 10^{-3}$$

$$A_2 \times (0.52398 \times 10^{-3} - 0.028183 \times 0.048 \times 10^{-3})/0.971817$$

$$= 0.53778 \times 10^{-3}/°C$$

Figure 6:
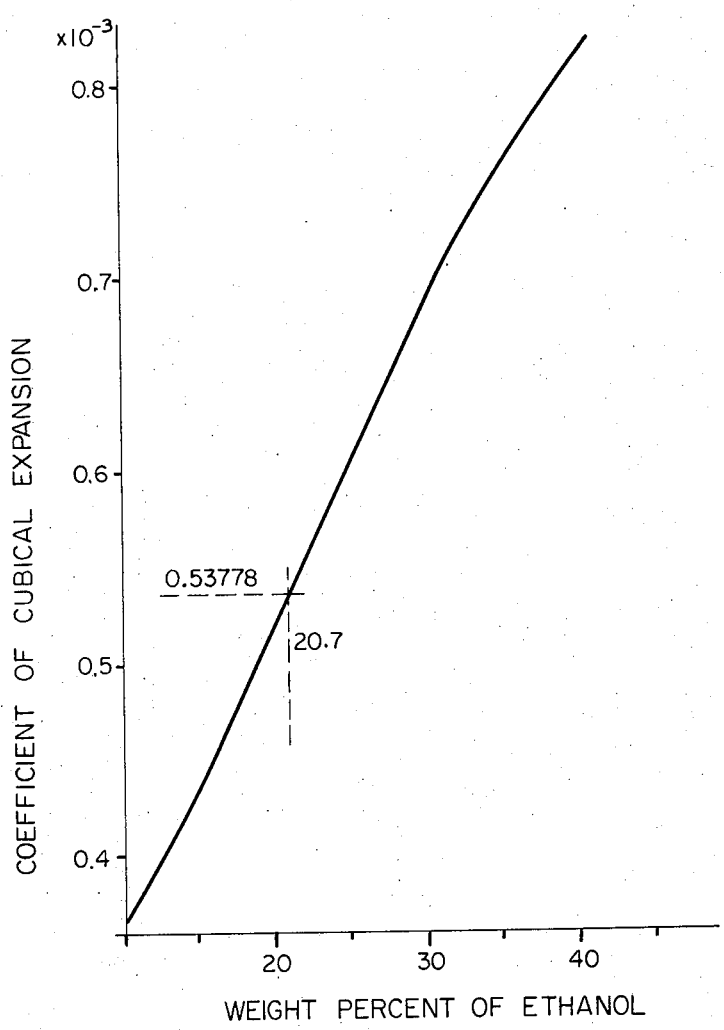
FIG. 6 is a graph showing the relationship between the concentration (in weight percent) of ethanol and its coefficient of cubical expansion.

FIG. 6 shows the relationship between the concentration (in weight percent) of ethanol and its coefficient of cubical expansion. Then, using the graph shown in FIG. 6, the weight percent of ethanol which has $0.53778 \times 10^{-3}/°C$ of coefficient of cubical expansion is found to be 20.7 weight percent. Therefore, as the standard liquid for above described float (71) a water solution containing 20.7 weight percent ethanol should be provided in the chamber (76) for detecting the concentration of the water solution of ethanol in the process line.

In this case, the variations of the volume of the sample liquid and the volume of the float are as follows:

| Temperature in °C. | The volume of the sample liquid in cc. | The volume of the standard liquid in cc. | The volume of the solid part of the float in cc. | The volume of the float in cc. |
|---|---|---|---|---|
| 10 | 2039.8646 | 1981.5316 | 57.9992 | 2039.5308 |
| 15 | 2043.7313 | 1985.5174 | 57.9994 | 2043.5168 |
| 20 | 2048.0355 | 1989.9306 | 57.9996 | 2047.9302 |
| 25 | 2052.8038 | 1994.7562 | 57.9998 | 2052.7560 |
| 30 | 2058.0000 | 2000.0000 | 58.0000 | 2058.0000 |
| 35 | 2063.5874 | 2005.6057 | 58.0004 | 2063.6061 |
| 40 | 2069.5722 | 2011.6003 | 58.0006 | 2069.6009 |

Figure 7:
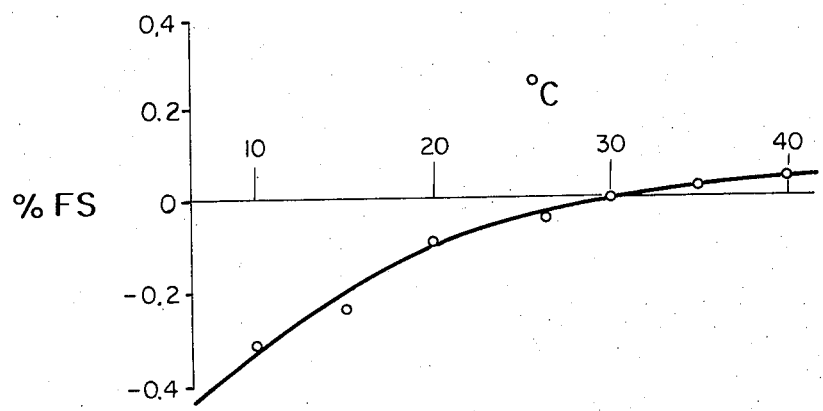
FIG. 7 is a graph showing the relationship between the temperature and the percentage of error in measurement of concentration of a water solution of ethanol, using a densimeter of this invention.

The extent of the error is shown in FIG. 7. On the graph in FIG. 7, the abscissa shows temperature and the ordinate shows the error percentage in full scale. This graph shows clearly that the error in measuring the concentration of liquid with the densimeter of this invention is extremely small compared with the prior art.

The following is claimed:

1. A densimeter comprising a vessel for containing a sample liquid, a float placed in the sample liquid in the vessel, and means for detecting an extent of force causing a buoyancy of the float, the float having a chamber formed of flexible thin sheet material and defined directly by an inner wall of the flexible thin sheet material whereby the volume of the chamber is changeable smoothly, the chamber being filled directly with a standard liquid having a larger coefficient of cubical expansion than the coefficient of cubical expansion of the sample liquid and the float having a coefficient of cubical expansion which is substantially equal to that of the sample liquid.

2. A densimeter according to claim 1 wherein the float is composed of a solid column portion and a chamber.

3. A densimeter according to claim 1 wherein a main portion of the cross-sectional shape of the chamber is approximately square.

4. A densimeter according to claim 1 wherein a main portion of the chamber comprises bellows.

5. A densimeter according to claim 1 wherein a main portion of the cross-sectional shape of the chamber is approximately elliptical.

6. A densimeter comprising a vessel for containing a sample liquid, a float positioned in the sample liquid in the vessel, and means for detecting the extent of the force causing buoyancy of the float, the float having the chamber substantially formed of flexible thin sheet material and defined directly by an inner wall of the flexible thin sheet material whereby the volume of the chamber is changeable smoothly, the chamber being constructed and arranged to be filled directly with standard liquid having a larger coefficient of cubical expansion than the coefficient of cubical expansion of the sample liquid, and the float having a substantially equal coefficient of cubical expansion to the coefficient of cubical expansion of the sample liquid when the chamber is filled with the standard liquid.

7. A temperature-independent method for measuring the concentration of a sample fluid by the use of a densimeter utilizing a float adapted to be filled with a fluid, comprising the steps of: ascertaining the coefficient of cubical expansion of said sample fluid; ascertaining the coefficient of cubical expansion of said float when empty of fluid; selecting a standard fluid such that when said float is filled with said standard fluid, said filled float has a coefficient of cubical expansion substantially identical with said coefficient of cubical expansion of said sample fluid; filling said float with said standard fluid; and suspending said filled float vertically in said sample fluid from sensing means sensitive to the vertical position of said suspended float.

8. A densimeter for measuring the concentration of a sample fluid, comprising: a float adapted to be suspended vertically in said sample fluid, said float comprising a chamber formed from a flexible thin sheet material, said chamber being filled with a selected standard fluid, said selected standard fluid having a cubical coefficient of expansion such that the cubical coefficient of expansion of said float, when said chamber is filled with said selected standard fluid, is substantially identical to the cubical coefficient of expansion of said sample fluid; and sensing means, from which said float is suspended, sensitive to the vertical position of said float.

* * * * *